C. D. HASKINS.
DRIVING DYNAMOS FROM VARIABLE AND NON-VARIABLE SOURCES OF POWER.
APPLICATION FILED AUG. 5, 1908.

996,334.

Patented June 27, 1911.

3 SHEETS—SHEET 3.

UNITED STATES PATENT OFFICE.

CARYL D. HASKINS, OF SCHENECTADY, NEW YORK, ASSIGNOR TO GENERAL ELECTRIC COMPANY, A CORPORATION OF NEW YORK.

DRIVING DYNAMOS FROM VARIABLE AND NON-VARIABLE SOURCES OF POWER.

996,334.

Specification of Letters Patent. Patented June 27, 1911.

Application filed August 5, 1908. Serial No. 447,024.

*To all whom it may concern:*

Be it known that I, CARYL D. HASKINS, a citizen of the United States, residing at Schenectady, county of Schenectady, State of New York, have invented certain new and useful Improvements in Driving Dynamos from Variable and Non-Variable Sources of Power, of which the following is a specification.

This invention relates to systems of generating electric current, in which a dynamo electric generator is driven alternately by a variable or fluctuating source of power, such as a windmill or a car axle and a non-variable or steady source of power, such as an internal combustion engine; the latter being brought into action when the former falls below a predetermined speed, in order to maintain a fairly constant voltage at the terminals of the generator.

The invention enables one to dispense with the storage batteries customarily used, and also with the more or less complicated and expensive pole changers, automatic switches and other apparatus necessary in installations which include batteries.

My aim has been to simplify the apparatus; to provide for maintaining the lighting at the proper intensity while the windmill or the car is at rest; to avoid everything that would involve any risk from fire in case of the wrecking of a car. Instead of a storage battery, I combine with a windmill or axle-driven dynamo a prime mover, preferably an internal combustion engine, arranged and constructed to take over the load when the mill or the car is at a standstill, or when its running speed becomes too low to drive the dynamo at a sufficient speed to maintain normal voltage.

The generator is geared to the mill or to the car axle through a clutch which permits the generator shaft to overrun the driver. The internal combustion engine is coupled to the generator shaft by a centrifugal or other speed-responsive clutch which closes when the speed of said shaft falls below a predetermined value. At the same time, or just prior to the closing of said clutch, the ignition circuit of the engine is closed automatically. The fuel I prefer is alcohol, and the reservoir in which it is carried is placed in a water tank, so that in case of an accident to a car and the wrecking of the tank, the water will dilute the alcohol sufficiently to prevent it from igniting.

Figure 1:
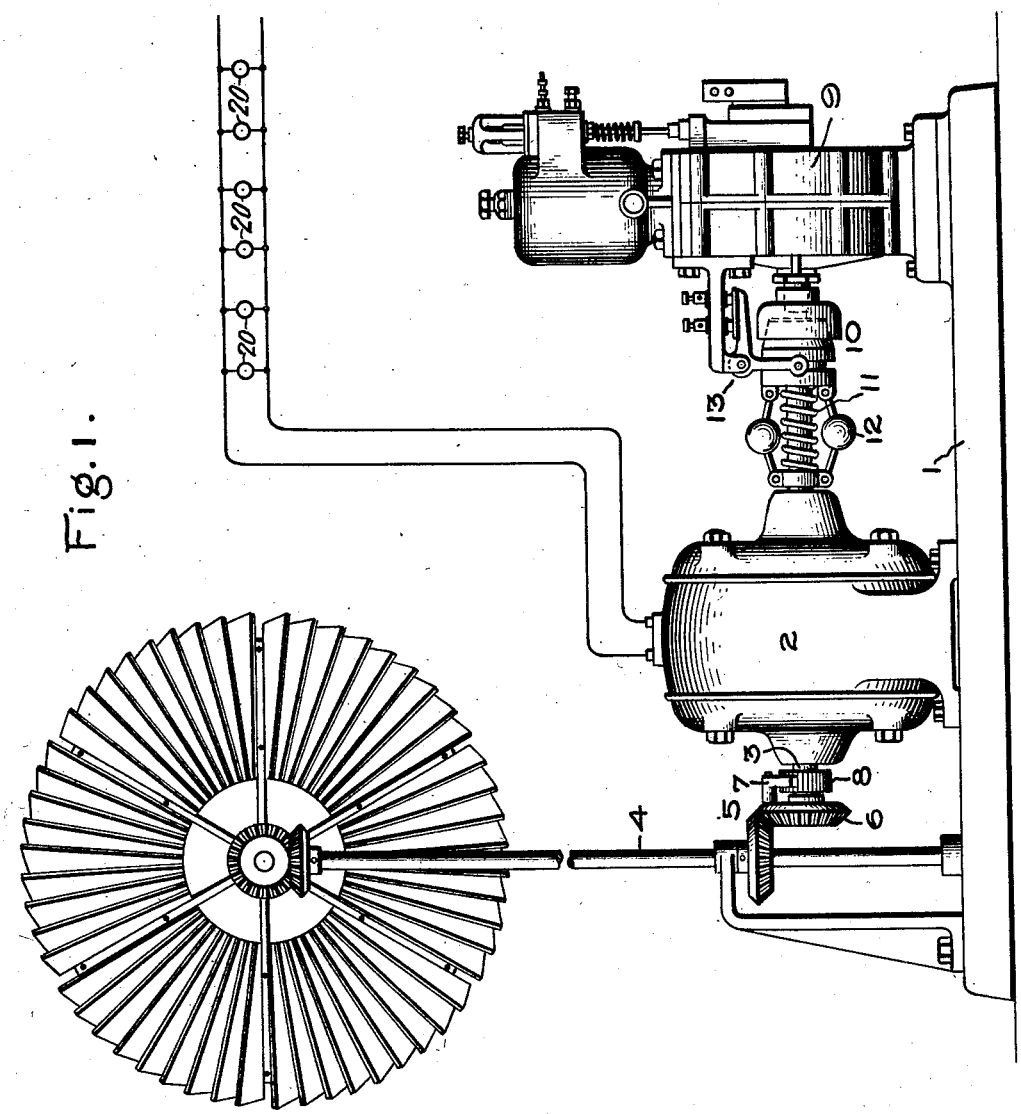
Figure 2:
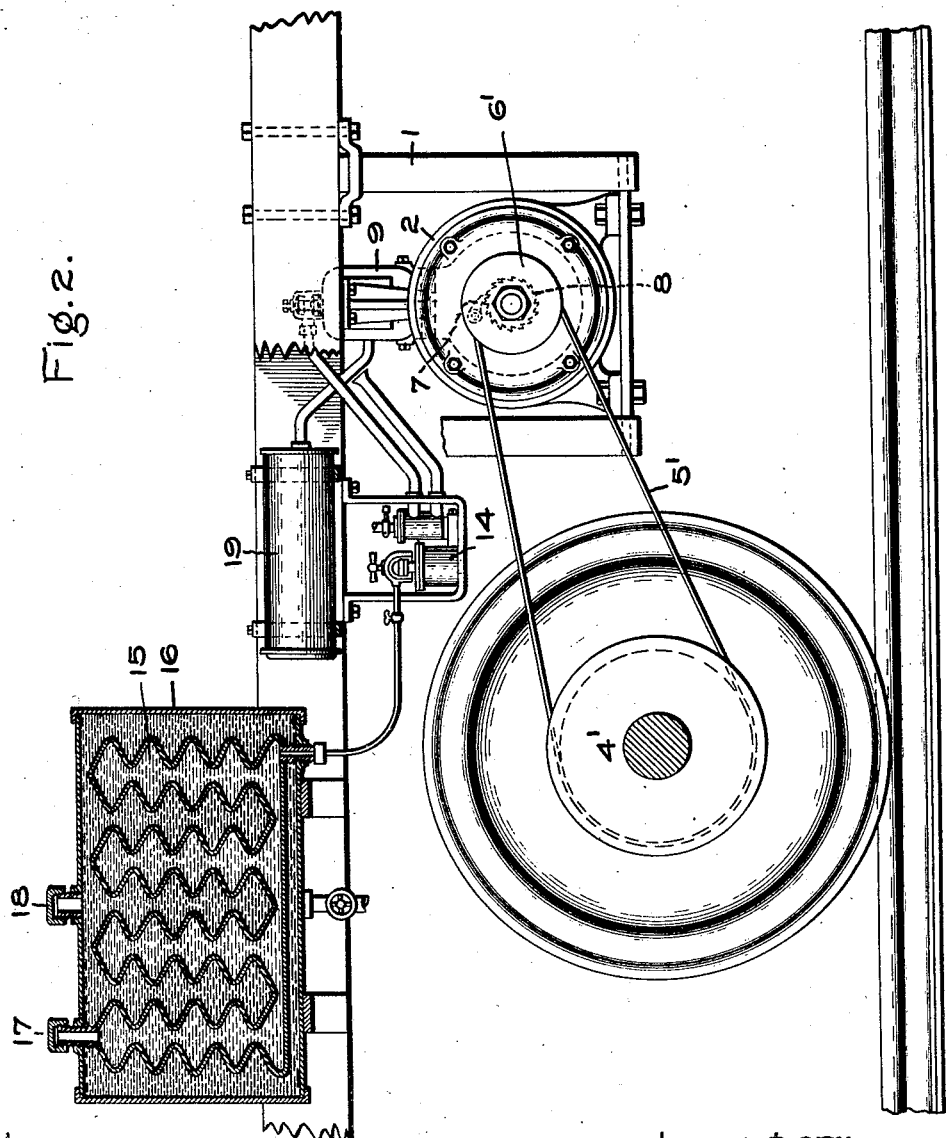
Figure 3:
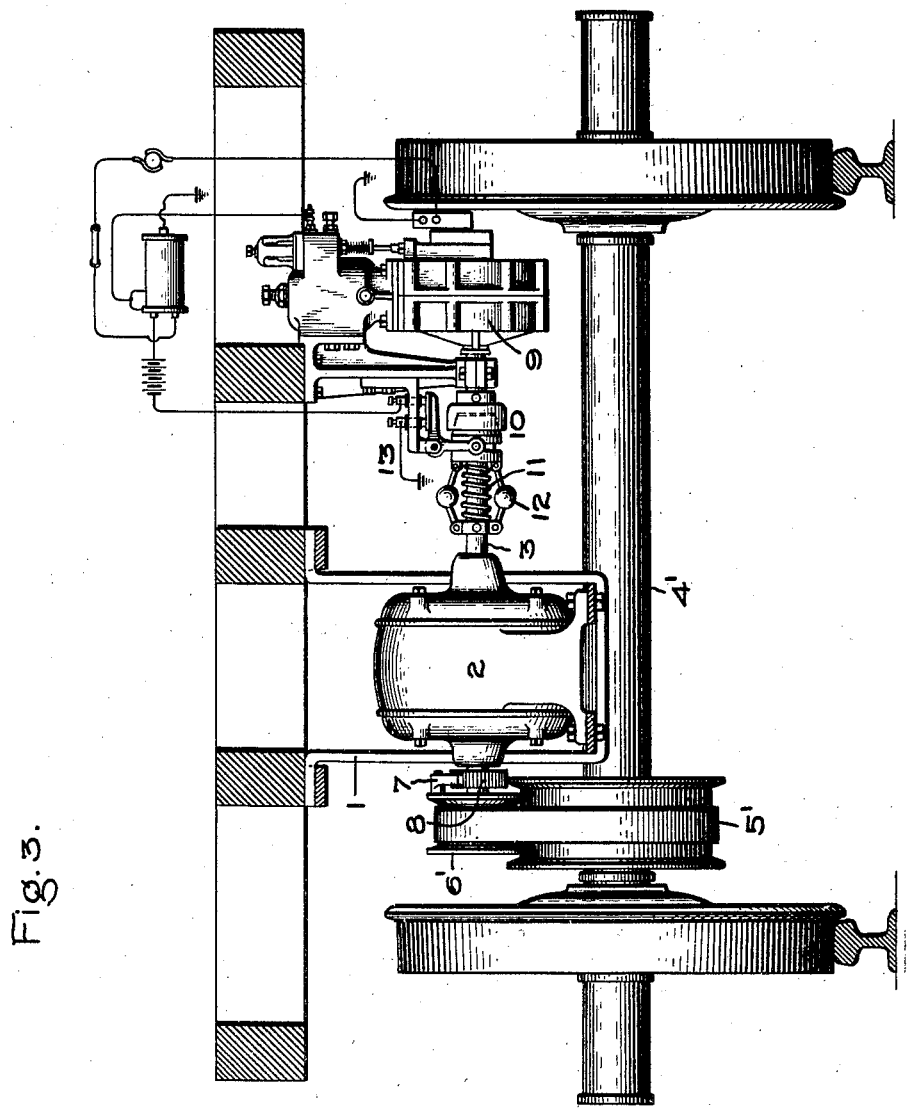

In the accompanying drawings, Figure 1 is an elevation of a windmill equipped with my improved system; Fig. 2 is a side elevation of a car truck similarly equipped; and Fig. 3 is an end elevation of said truck.

On a suitable support 1 is placed a dynamo electric generator 2, so constructed as to give a minimum variation of voltage under maximum variation of speed. If desired, some form of automatic regulator may be used to achieve this result, but this is not an essential part of my invention. The rotor of the generator is mounted on a shaft 3 which is geared at one end to the shaft 4 of the windmill or to the car axle 4'. Bevel gearing 5 may be used for the windmill, but on the car truck I prefer to use the belt gearing 5'. The bevel gear 6 and the pulley 6' on the generator shaft are not attached thereto but run loose, with a unidirectional clutch which connects them to said shaft when it rotates in one direction, but permits said shaft to overrun said gear or pulley when driven faster than they. As illustrating such a clutch, I have shown a pawl 7 on the gear and pulley co-acting with a ratchet wheel 8 on the generator shaft.

An internal combustion engine 9, preferably one burning alcohol, is supported with its shaft in line with that of the generator. Each shaft carries one-half of a clutch 10, and the half on the generator shaft is movable in order to open and close said clutch, either directly by friction or other mechanical devices, or in any other suitable manner. I have chosen to illustrate a mechanical device or clutch in which the movable member of the clutch is provided with a spring 11 for urging it closed, and with fly-balls 12 or the like to pull it open when a predetermined speed is attained. In connection with this member of the clutch is a switch 13 which controls the ignition circuit of the engine. When the clutch opens and uncouples the engine from the generator, the ignition circuit also is opened to stop the engine.

Alcohol is fed to the carbureter 14 from a reservoir 15, which is composed preferably of a plurality of cells, as shown, connected together and submerged in a water tank 16. The reservoir can be filled through the nozzle 17 and the tank through the nozzle 18. The water in this tank, may, if desired, be used for cooling the engine, and the heat it absorbs will be communicated to the alcohol and facilitate its carbureting. The engine exhausts through a muffler 19.

The operation of the system is as follows: Assuming that the windmill or car is standing still, the clutch 10 will be closed, coupling the engine to the generator. The engine is started by cranking it by hand, the armature circuit of the generator being open. When the engine has come up to the proper speed, the load circuit may be put on, and the lamps 20 will be lighted by the engine so long as said mill or car remains at rest; the ratchet wheel 8 turning freely under the pawl 7.

After the windmill or car starts, the engine continues to run, but as the mill or car accelerates in speed, the peripheral speed of the gear 6 or pulley 6′ approaches nearer and nearer to that of the generator shaft until at length it equals it. At this point the pawl will engage with the ratchet wheel, and the mill or the car axle will begin to drive the generator simultaneously with the engine. The centrifugal clutch is adjusted to open at this speed, which may be called the "critical speed" of the system. At the instant that the clutch opens and the load is transferred from the engine to the mill or car axle, the switch 13 is also opened by the action of the clutch, thereby stopping the engine. The generator will now be driven entirely from the windmill or car axle until such time as the mill or car slows down to a point where the generator shaft rotates below the "critical speed", when the spring will throw in the clutch between the engine and the generator and will also close the ignition circuit of the engine. The engine will then be driven from the mill or axle, but after a revolution or two it will begin operating by its own power, and as it comes up to normal speed it will pick up the load and cause the generator once more to overrun the slow running gear or pulley. In this way, by the alternate action of the engine and the variable driver, the former picking up the load when the latter is at rest or falls below the "critical speed", and the latter assuming the load when it exceeds the "critical speed", the speed and voltage of the generator are kept fairly constant, and the intensity of the lighting is maintained without the employment of storage batteries, and in the case of a car independently of every other car in the train.

It is, of course, understood that provision will be made on the car truck for keeping the generator in gear with the axle while rounding curves; for permitting the car to run either end foremost, and for meeting other practical problems necessarily involved in the actual installation of my system. As these matters form no part of my invention, I have not illustrated or described them. But in accordance with the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. The combination with a generator, of means for maintaining a fairly constant potential on said generator comprising a fluctuating source of power, a steady source of power, and means for coupling said generator to the latter source when the former falls below a critical speed and for automatically uncoupling the steady source when the fluctuating source exceeds the critical speed.

2. The combination with a generator, of means for maintaining a fairly constant potential on said generator comprising a fluctuating source of power, a steady source of power, automatic devices for coupling said generator to each source, and means for automatically uncoupling the latter source when the former exceeds a critical speed.

3. The combination with a generator, of means for maintaining a fairly constant potential on said generator comprising a fluctuating source of power, a steady source of power, a unidirectional clutch between the generator and the fluctuating source, and a speed-responsive clutch for coupling the generator to said steady source and for automatically uncoupling the steady source when the fluctuating source exceeds a critical speed.

4. The combination with a generator, of means for maintaining a fairly constant potential on said generator comprising a fluctuating source of power, a steady source of power, means for coupling said generator to said fluctuating source, means for coupling said generator to said steady source and for automatically uncoupling the steady source when the fluctuating source exceeds a critical speed, and means for stopping said steady source of power when it is uncoupled.

5. The combination with a generator, of means for maintaining a fairly constant potential on said generator comprising a fluctuating source of power, a steady source of power, means for coupling said generator to said fluctuating source, and means for coupling said generator to said steady source, for automatically uncoupling the steady source when the fluctuating source exceeds a critical speed and for automatically starting said steady source when it is again coupled to the generator.

6. The combination with a generator, of means for maintaining a fairly constant potential on said generator comprising a fluctuating source of power, a uni-directional clutch between said source and the generator shaft, an internal combustion engine, and a speed-responsive clutch between said engine and the generator shaft.

7. The combination with a generator, of a fluctuating source of power, a uni-directional clutch between said source and the generator shaft, an internal combustion engine, a speed-responsive clutch between said engine and the generator shaft, and a switch in the ignition circuit of said engine controlled by said speed-responsive clutch.

8. The combination with a generator, of a shaft running at varying speeds, a clutch operating to connect said shaft and generator when the former is running the faster, but permitting the generator to over-run the shaft when necessary, an internal combustion engine, and a centrifugal clutch on the generator shaft operating to connect said generator with the engine when the speed of the generator shaft falls below a predetermined speed.

9. The combination with a generator, of a shaft running at varying speeds, a clutch operating to connect said shaft and generator when the former is running the faster but permitting the generator to over-run the shaft when necessary, an internal combustion engine, a centrifugal clutch on the generator shaft operating to connect said generator with the engine when the speed of the generator shaft falls below a predetermined speed, and a switch in the ignition circuit of said engine, connected with a moving part of said centrifugal clutch so as to open or close therewith.

In witness whereof, I have hereunto set my hand this 3rd day of August, 1908.

CARYL D. HASKINS.

Witnesses:
 BENJAMIN B. HULL,
 HELEN ORFORD.